United States Patent [19]

Thome et al.

[11] Patent Number: 5,289,584
[45] Date of Patent: Feb. 22, 1994

[54] MEMORY SYSTEM WITH FIFO DATA INPUT

[75] Inventors: Gary W. Thome, Houston; Mustafa A. Hamid, Irving, both of Tex.

[73] Assignee: Compaq Computer Corp., Houston, Tex.

[21] Appl. No.: 719,198

[22] Filed: Jun. 21, 1991

[51] Int. Cl.$^5$ .............................................. G06F 13/00
[52] U.S. Cl. ..................................... 395/325; 395/250; 364/926.3; 364/939.1; 364/964.33; 364/966.3; 364/DIG. 2; 365/230.04
[58] Field of Search ............... 395/325, 425, 725, 250; 364/246.4, DIG. 1, 966.3, 964.33, 926.3, 939.1, DIG. 2; 365/230.04, 230.03, 238.5, 189.05

[56] References Cited

U.S. PATENT DOCUMENTS

| | | | |
|---|---|---|---|
| 4,424,561 | 1/1984 | Stanley et al. | 364/200 X |
| 4,447,878 | 5/1984 | Kinnie et al. | 395/325 |
| 4,725,945 | 2/1988 | Kronstadt et al. | 395/425 |
| 4,800,530 | 1/1989 | Itoh et al. | 365/230.04 |
| 4,803,621 | 2/1989 | Kelly | 395/400 |
| 4,866,603 | 9/1989 | Chiba | 395/425 |
| 4,870,622 | 9/1989 | Aria et al. | 365/230.02 |
| 4,903,197 | 2/1990 | Wallace et al. | 395/425 |
| 4,918,587 | 4/1990 | Pechter et al. | 395/400 |
| 4,924,375 | 5/1990 | Fung et al. | 364/200 X |
| 5,051,889 | 9/1991 | Fung et al. | 395/425 |

*Primary Examiner*—Allen R. MacDonald
*Assistant Examiner*—Glenn A. Auve
*Attorney, Agent, or Firm*—Pravel, Hewitt, Kimball & Krieger

[57] ABSTRACT

At least two double buffers or FIFOs, each FIFO including a first group of latches in series with a second group of latches, coupled between a host data bus and a corresponding bank or way of interleaved memory. The inputs of the first group of latches are coupled to the host data bus, and the inputs of the second group of latches are coupled to the outputs of the first group of latches of each double buffer or FIFO. The outputs of the second group of latches are coupled to the memory data bus of the corresponding way of interleaved memory. During a burst write sequence, an address is placed on the host address bus and a series of data doublewords are sequentially placed onto the host data bus, while the DRAMs of main memory are entering into page mode. The first group of latches of each double buffer or FIFO latches in every other data doubleword. The second level of latches stores the data from the corresponding first level of latches to provide the data to the DRAMs according to the timing requirements of the DRAMs. In this manner, the CPU or cache controller providing data to the host bus may operate at full speed without inserting wait states while the DRAMs enter into page mode.

16 Claims, 4 Drawing Sheets

MEMORY SYSTEM WITH FIFO DATA INPUT

BACKGROUND OF THE INVENTION

1. Field of the Invention

This invention relates to first-in first-out (FIFO) buffering of data written to a memory section of a computer system to allow zero wait state burst write operations.

2. Description of the Related Art

The personal computer industry is evolving quickly as new innovations occur. The driving force behind this innovation has been the increasing demand for faster and more powerful computers. To meet this ever increasing demand, microprocessors, or central processing units (CPUs), are constantly being improved by increasing their speed and capabilities. These CPU's require corresponding supporting circuitry to utilize the CPU's capabilities and to maximize the speed and efficiency of the overall computer system. One example of a high performance CPU is the i486 from the Intel Corporation (Intel) which supports burst data transfers. A burst transfer is one of the fastest methods of transferring data in a computer system. The fastest burst cycles in a typical computer system with a clock frequency of 25 or 33 MHz may require only one clock cycle for consecutive data transfers, while non-burst single data cycles require a minimum of two clock cycles for every data transfer.

Burst cycles are generally provided for data transfers between the CPU and its internal and external cache memories. Cache memory was developed to bridge the gap between fast processor cycle times and slow memory access times. Cache memory is a small amount of very fast, relatively expensive, zero wait state memory that is used to store a copy of frequently accessed code and data from main memory. The external cache memory for an i486 microprocessor, for example, may include a C5 or 82495 cache controller and an array of C8 or 82490 cache memory data chips, all from Intel. The C5 cache controller is capable of supporting burst cycles between the CPU and the cache memory and utilizing burst cycles with the main memory in the computer system. Cache memory is usually implemented using static random access memories (SRAMs) which provide the speed and simplicity required to interface with the CPU. Each C8 memory chip is implemented using SRAM technology to provide the speed required to interface with the C5 cache controller. Because of their great speed, the C8 cache memories can readily handle operations, even for up to 50 MHz operation.

The main memory of a computer system is usually implemented with dynamic RAMs (DRAMs) which, when compared to SRAMs, are higher capacity, lower cost and lower power memories which run at moderate speeds. DRAMs are desirable even though they are significantly slower than SRAMs, since main memory comprises a very large amount of memory and SRAMs are appreciably more expensive than DRAMs. Main memory would be too costly if implemented with SRAMs. DRAM memory cells are basically charge storage capacitors with drive transistors, thereby making DRAMs slower than SRAMs. Due to the capacitance of DRAMs, DRAMs require more time than SRAMs to store or write data into their memory cells, and they require separate refresh circuitry to maintain the charge of each memory cell. Further, for packaging reasons DRAMs use a multiplexed addressing structure where one-half of the memory address, referred to as the row address, is provided in a first cycle and the remainder of the address, the column address, is provided in a second cycle. The use of the multiplexed addressing saves space but consumes time. Consequently, DRAMs require extra time to provide the row and column addresses, as well as extra time to store data in its internal memory cells corresponding to the address. Therefore, DRAMs require an appreciable amount of set-up and cycle time.

A popular type of DRAM is the page mode DRAM which supports page mode addressing, wherein a row address is provided to access a page in memory, and multiple column addresses are subsequently provided to read or write data within that page of memory. For purposes of this disclosure, static column DRAMs are considered functionally the same as true page mode DRAMs and any reference to page mode DRAMS will include a reference to static column DRAMs. Once the page is initialized, reads and writes to and from the page are faster than regular DRAMs. Page mode DRAMs still require, however, a significant amount of time to provide the row addresses should the required data not be on the particular page.

Page mode DRAMs provide faster data transfer between a cache controller and main memory than regular DRAMs since once a particular page is established subsequent reads and writes to that page can be completed in less time. Page mode DRAMs are, therefore, more suitable for burst cycles than regular DRAMs. Memory and supporting logic should be fast enough to handle the high speed transfer of data when interfacing with a cache controller during a burst cycle since otherwise the cache controller must provide extra wait states during the burst cycle, thereby degrading system performance. Both the page hit or column only and page miss or row and column access times of DRAMs prevent burst cycles directly with a C5 cache controller without the insertion of an appreciable number of wait states while the DRAMs are providing the row address to access a desired page.

Memory interleaving provides a partial solution to the slower cycle times of the DRAMs, since it allows the DRAMs to effectively operate at half the speed of the cache controller. The memory is partitioned into at least two banks or ways of DRAMs so that each way only has to store half the data and, consequently, only has to access every other data packet being provided on the host data bus. For example, even-addressed data may be read from or written to a first way of DRAMs, while odd-addressed data may be read from or written to a second way of DRAMs. Interleaving the DRAMs in this manner allows each DRAM way to operate at slower speeds, thereby allowing the cache controller to operate at a higher speed. Nonetheless, page mode DRAMs still require an appreciable amount of time to provide the row addresses and to initialize the DRAM into page mode. This significant amount of setup time thus reduces system performance since the system must insert wait states while the page address is being established in the DRAMs before allowing transfer of the data in a burst cycle. Thus, even with the use of page mode DRAMs and interleaving, burst cycles from current cache controllers and microprocessors are still too fast to operate without developing extra wait states and reducing potential system performance.

SUMMARY OF THE PRESENT INVENTION

The memory system first-in first-out (FIFO) data input according to the present invention allows a cache controller to write data in a burst sequence to DRAMs arranged in interleaved format in main memory without inserting extra wait states. A system according to the present invention utilizes a two data packet deep FIFO or double buffer in combination with interleaving and page mode DRAMs having a page hit only cycle time sufficient to meet burst speeds, when interleaved, to allow a computer system to operate at the maximum speed of the CPU or cache controller, thereby optimizing the overall system performance while allowing the main memory to be designed with slower and less expensive page mode DRAMs.

The FIFO is a double buffer or two stages deep for each memory interleave, or way, of the main memory. The memory may include, for example, a first way, way A, and a second way, way B. Since there is a corresponding FIFO for each way, there is a way A double buffer and a way B double buffer. Each memory way is responsible to capture every other data packet, or 32 bit doubleword, appearing on the host data bus corresponding to consecutive memory addresses. Each double buffer or FIFO includes a first series of latches, wherein the inputs of the latches are coupled to the host data bus, and a second series of latches, wherein the outputs of the first series of latches are coupled to the inputs of the second series of latches. The output of the second series of latches is coupled to the memory data bus of the way corresponding to the FIFO. Therefore, there is a way A FIFO coupled between the host data bus and the memory data bus of the way A, and a way B FIFO coupled between the host data bus and the way B memory data bus. In this manner, the first series of latches of each double buffer store or transmit every other data doubleword that appears on the host data bus. The second series of latches latch the data doubleword stored or transmitted by the first series of latches and provide this data doubleword to the corresponding memory way. A memory controller controls the operation of each of the double buffers or FIFOs. A state machine and associated decoding logic provide the control signals to the control inputs of each of the latches in the double buffers to provide latching action at the appropriate time. The control signals to the double buffers provided by the state machine and decoding logic are determined by the state of the state machine as well as other signals, such as a portion of the address appearing on the host address bus, which is used to determine for which way the data is intended, and the read/write signal to determine whether a read or write cycle is occurring.

During a burst write sequence, the cache controller places an address on the host address bus and then places a data doubleword on the host data bus intended for the way A memory. The way A and way B DRAMs receive the row address and begin initializing into page mode while the data is latched into the first and second level latches of the way A double buffer. This allows data to immediately appear on the way A memory data bus. The second level latches keep the data latched and stable on the way A memory data bus until the way A DRAMs are set up into page mode and the column address and strobe can be provided.

The second data doubleword is placed onto the host data bus after the first data doubleword is latched into the way A double buffer but before the DRAMs have completed the row address sequence. The second data doubleword is latched into the first and second level latches of the way B double buffer, so that the data is transferred quickly from the host data bus to the way B memory data bus. The second data doubleword is thus provided to the way B DRAMs. The second level latches of the way B double buffer keep this data latched and stable until the way B DRAMs have completed the row address sequence and are ready for the data.

The way A and way B DRAMs are just completing the row address sequence and have yet to store the first and second data doublewords, respectively, when the third data doubleword of the burst transfer is provided to the host data bus. This emphasizes and illustrates the importance of the double buffers of the present invention, since without them the third data doubleword would be lost. The first level of latches of the way A double buffer latches the third data doubleword into the first level latches while the second level of latches of the way A maintains the first data doubleword on the memory data bus of the way A. Thereafter, both the A and B ways commence the column address sequence and store the first and second data doublewords, respectively, being provided by the second level latches. A single buffer or latch would be unable to capture the third data doubleword from the host bus while providing the first doubleword to the way A DRAMs.

Meanwhile, a fourth data doubleword appears on the host data bus. By this time, the way A and way B DRAMs have received the column addresses and have stored the first and second data doublewords, respectively, as provided by the second level of latches of the way A and way B double buffers. Since the way B has successfully stored the second data doubleword, it is now ready for the fourth data doubleword. Therefore, both the first and second level latches of the way B double buffer latch in the data from the host data bus, with the second level latches providing the data to the way B memory data bus. Since the way A has stored the first data doubleword, it is ready for the third data doubleword. Therefore, the second level of latches of the way A double buffer latches in the third data doubleword being provided by first level of latches and provides it to the way A memory data bus.

Notice that up to this point, the way A double buffer has provided the first and third data doublewords from the host data bus to the way A, while the way B double buffer has provided the second and fourth data doublewords from the host data bus to the way B. The way B double buffer thereafter latches in every other data double buffer word appearing on the host data bus throughout the remainder of the burst cycle and holds this data latched and stable to the way B for twice the period that the data appears on the host data bus. Similarly, the first level latches of the way A double buffer latch in the odd numbered data double buffer words and the second level latches of the way A double buffer latch this data later and provide it to the way A DRAMs. Both the second level latches of both the way A and way B double buffers provide their data to their corresponding A and B ways for twice the length the data is present on the host bus. The operation described above repeats during the remainder of the burst sequence.

Thus the cache controller has provided a full burst cycle with no extra wait states to memory devices which can maintain speed, when interleaved, once in page mode but cannot maintain the speed when a row address must be provided. This allows the use of slower, less expensive DRAMS without sacrificing performance by including extra wait states.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
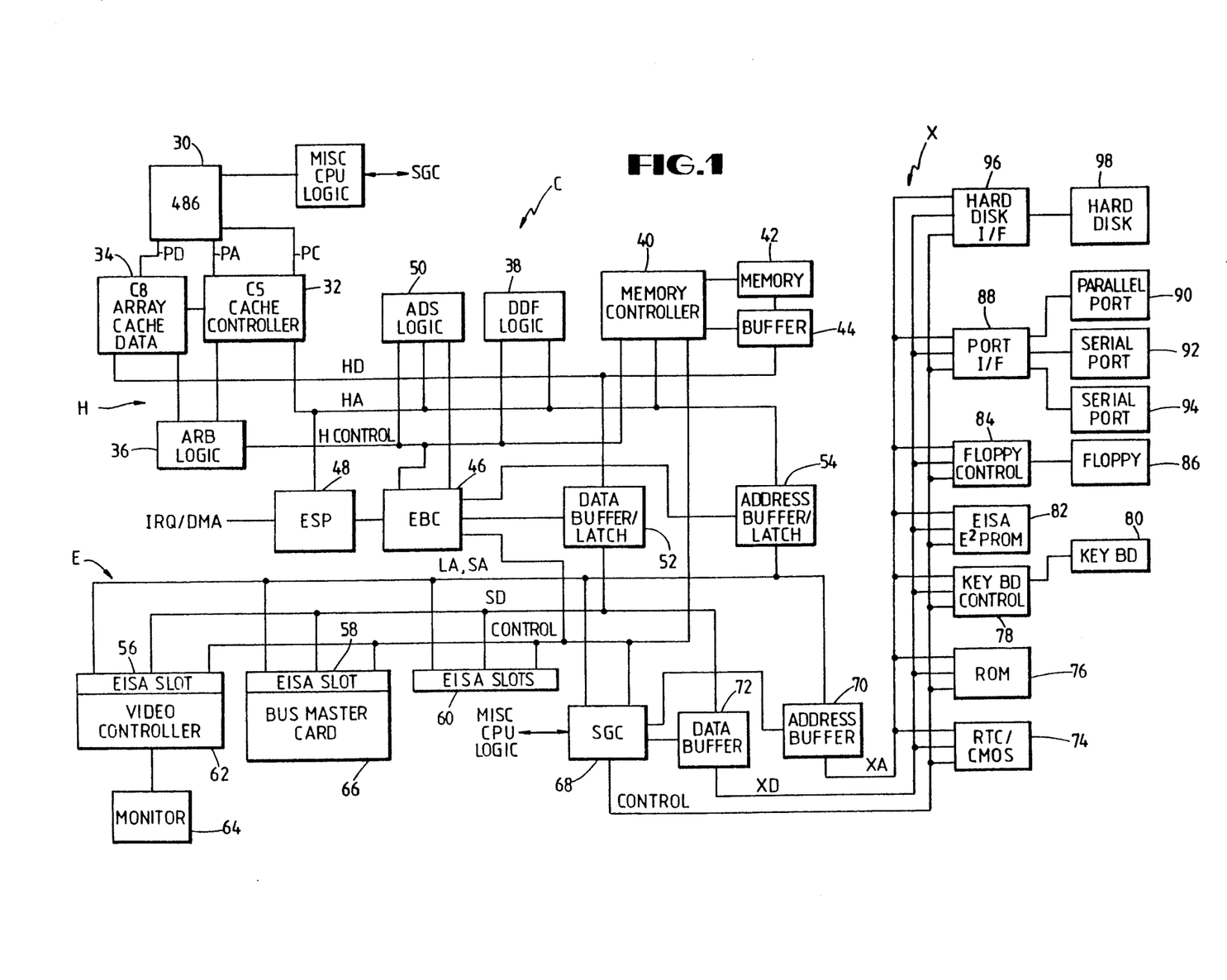
FIG. 1 is a block diagram of a computer system incorporating the present invention.

Referring now to FIG. 1, a computer system generally referred to by the letter C incorporating the present invention is shown. The foundation of a computer system C according to the present invention is a microprocessor 30, preferably the i486 from Intel Corporation (Intel). Connected to the microprocessor 30 is a cache subsystem comprising a cache controller 32, preferably the C5 or 82495 cache controller by Intel, and an array of cache data RAM's 34, preferably the C8 or 82490 data RAM's also from Intel. The microprocessor 30, the cache controller 32 and the cache data RAM's 34 are connected as indicated and specified by Intel. To this end the processor data bus PD is connected to the data RAM's 34 and the processor address bus PA and the processor control bus signals PC are connected to the cache controller 32. Preferably the components are the 50 MHz versions. The cache controller 32 and the cache data RAM's 34 are also connected by various control signals.

The cache controller 32 and the cache data RAM's 34 are coupled to a bus generally referred to as the host bus H which includes a host data bus HD portion, a host address bus HA portion and a host control bus HCONTROL portion. Arbitration logic 36 produces some control signals in the HCONTROL bus from signals provided by the cache controller 32 and the cache data RAM's 34. The HCONTROL bus includes signals such as the memory read or write signal, the memory or input/output signal, various address and data strobes and so on as commonly utilized by the various other elements in the computer system C.

Connected to the host bus H is a memory subsystem including data destination facility (DDF) logic 38, a memory controller 40, memory 42 and a memory data buffer 44. The DDF logic 38 provides address translation and memory module activation and is more completely described in U.S. patent application no. 431,666 filed Nov. 3, 1989 and in its European Patent Office counterpart having an application number of 90 311 749.7 and a filing date of Oct. 26, 1990, which was published on May 8, 1991, both of which are hereby incorporated by reference. The memory controller 40 provides the various control functions necessary to allow the various units operating on or over the host bus H to interact with the actual memory devices 42. The memory 42 is comprised of a series of page mode dynamic random access memories (DRAMs) arranged in an interleaved format. The memory controller 40 includes the necessary functions to control the operation of the DRAMs and of the data buffer 44. The operation of the memory controller 40 and buffer 44 will be explained in greater detail below.

In the preferred embodiment, the computer system C utilizes the EISA or Extended Industry Standard Architecture for the external bus. The EISA bus is generally referred to by the letter E in the FIGURE. The EISA bus E is comprised of several portions, the LA and SA address buses, the SD data bus and the control bus. A bus controller 46 referred to as the EBC, provides certain of the necessary control functions between the host bus H and the EISA bus E. Connected to the EBC 46 is the EISA system peripheral (ESP) 48, which includes various timers, the direct memory access (DMA) controller and the interrupt controller logic of the computer system C. Also connected to the EBC 46 is ADS or address strobe logic 50. The ADS logic 50 is used to convert certain differences in the various strobes from the cache controller 32 to those necessary for use by the EBC 46. The EBC 46 controls a data buffer/latch 52 connected between the host data bus HD and the external data bus SD and an address buffer/latch 54 connected between the host address bus HA and the external address buses LA and SA in the EISA bus E. Connected to the EISA bus E are a series of EISA slots 56, 58 and 60 according to the EISA convention. In the preferred embodiment, the EISA slot 56 is preferably a special slot having a pin adapted for special operations with a video controller 62. A monitor 64 is connected to the video controller 62. Additionally in the disclosed embodiment, one of the general purpose EISA slots 58 includes a bus mastering card 66 which operates according to the EISA specification. The bus mastering card allows high performance data transfers over the EISA bus E. As an example, the bus master card 66 may be a high performance disk controller which transfers information from the attached hard disk devices directly into the memory 42. This operation is controlled in part by the bus mastering card 66, in part by the EBC 46 and in part by the memory controller 40. It is noted that the bus master card 66 could be either an EISA bus master or an ISA bus master. The remaining EISA slots are generally referred to by the number 60 and in a typical design would include up to 6 slots for insertion of either other EISA cards or conventional ISA cards as readily available.

A fourth general bus referred to as the X bus is also present in the computer system C. The X bus is developed from the EISA bus E by means of a system glue chip (SGC) 68, which performs numerous address decoding operations; an address buffer 70 and a data buffer 72. The SGC 68 controls the operation of the data buffer 72 and the address buffer 70, as well as providing various strobes over an X control bus to the miscellaneous devices contained on the X bus. The first item contained on the X bus is a real time clock (RTC) 74, which contains the necessary CMOS memory and clock functions utilized in the computer system C. A read only memory (ROM) 76 includes the necessary basic operating software utilized in the computer system C and communicates over the X bus. A keyboard controller 78 is connected to the X bus and has connected to it a keyboard 80 to allow data entry. Optionally the keyboard controller 78 can include a second interface for a pointing device (not shown). An electrically erasable programmable read only memory (EEPROM) 82 is connected to the X bus to retain the extended set up information required for an EISA system relating to board configuration. A floppy controller 84 is connected to the X bus and has connected to it a floppy disk drive 86. A port interface circuit 88 is connected to the X bus and provides a parallel port 90 and two serial ports 92 and 94. Further, a hard disk interface 96 is connected to the X bus, with a hard disk 98 being connected to the interface 96. This list of peripheral devices is exemplary and numerous other peripheral devices could be developed either on the X bus or on the EISA bus E.

This description of the preferred embodiment of the computer system C is exemplary only and other variations in the computer system design could of course be developed.

Figure 2:
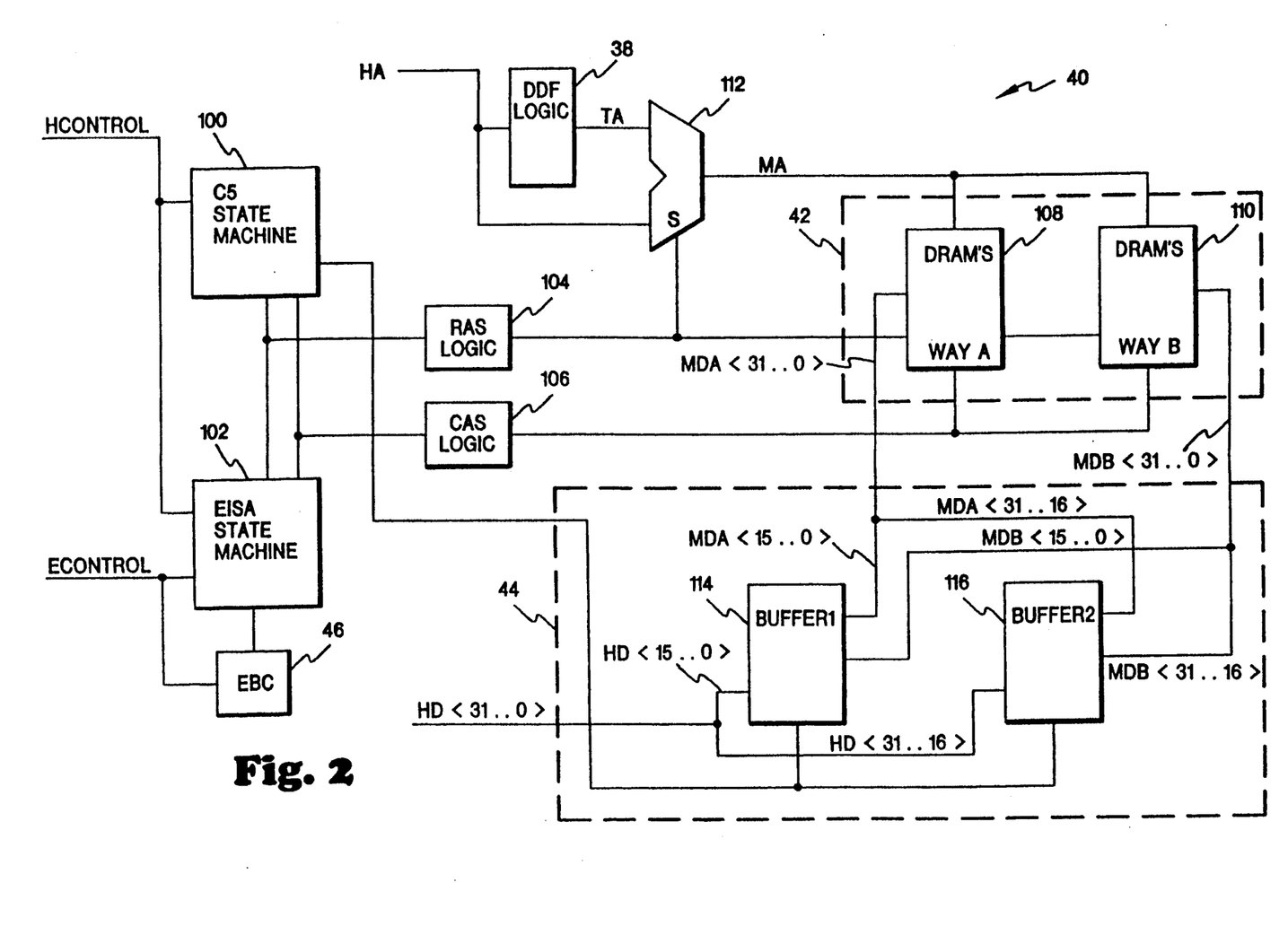
FIG. 2 is a block diagram of the memory portion of the computer system of FIG. 1 including FIFO according to present invention.

The memory subsystem is shown in more detail in FIG. 2. The basis of the memory controller 40 is a C5 state machine 100 and an EISA state machine 102. These state machines provide the controlling functions and sequencing logic for the memory controller 40 when, respectively, the C5 cache controller 32 is in control of the host bus H or the EBC 46 is controlling the host bus H to allow EISA devices to access the memory 42. The C5 state machine 100 and the EISA state machine 102 are connected to each other to allow communication between the state machines. Additionally, both state machines 100 and 102 are connected to the HCONTROL bus to receive control information. The EISA state machine 102 is connected to the EBC 46 and to the ECONTROL portion of the EISA bus E. Additionally, both state machines 100 and 102 are connected to row address strobe or RAS logic 104 and column address strobe or CAS logic 106. The RAS logic 104 and CAS logic 106 provide the RAS and CAS strobes to the various memory devices within the memory 42.

As shown in FIG. 2, the memory 42 is partitioned as an interleaved memory having two banks or ways. The first way is considered to be way A 108, while the second way is considered to be way B 110. Preferably, both ways are 32 bits wide and include parity information. With the use of interleaving, the effective speed of operation of the memory system can be increased as is conventional. A memory address bus MA is connected to the memory 42 as provided by the output of a multiplexor 112. The multiplexor receives the TA address signals from the DDF logic 38 as one input and the host address signals HA as the other input. Selection of the particular input of the multiplexor 112 is provided by an output of the RAS logic 104. In this manner, the row and column addresses can be readily provided to the memory 42.

In the preferred embodiment of the present invention, the way A 108 and way B 110 are comprised of page mode DRAMs which are high capacity, low power, low cost RAMs which operate at moderate speed. In the preferred embodiment, the DRAMs are 80 nsec access time devices. The DRAMs are arranged in an interleaved format to allow the memory to operate at effectively twice the speed of the specific devices. To accomplish interleaving, the way A 108 DRAMs preferably store data at even addresses and the way B 110 DRAMs preferably store data at odd addresses. In this manner, consecutive data packets traveling between the memory 42 and other devices are alternated between the way A 108 and the way B 110.

The host data bus HD is coupled to the memory 42 through the buffer 44, wherein the buffer 44 comprises two separate buffers BUFFER1 114 and BUFFER2 116. The host data bus HD preferably includes 32 bits, although the present invention is not limited to any particular width data bus. The lower bits of the HD host data bus, HD<15..0>, are coupled to the BUFFER1 114 and the upper bits of the HD host data bus, HD<31..16>, are coupled to the BUFFER2 116. The C5 state machine 100 provides control signals which are connected to the BUFFER1 114 and the BUFFER2 116 to control data flow to and from the memory 42.

The memory data bus preferably comprises two separate 32 bit buses, MDA and MDB, which are connected to the way A 108 and way B 110, respectively. The BUFFER1 114 is connected to the lower half of each of the MDA and MDB memory data buses, namely the MDA<15..0> and MDB<15..0> data bits, whereas the BUFFER2 116 is connected to the upper half of each of the MDA and MDB memory data buses, namely the MDA<31..16> and MDB<31..16> data bits. Each of the buffers BUFFER1 114 and BUFFER2 116 are substantially similar in operation and implementation.

The C5 cache controller 32, preferably operating at a clock speed of 50 MHz, effectively supplies data to the HD data bus approximately one clock cycle after the address on the HA address bus is considered valid, in the computer system of the preferred embodiment. In a burst sequence, which is the preferable method of data transfer due to its speed, each data doubleword is provided for approximately two clock cycles, such that the first data doubleword disappears after only three clock cycles after the address is first provided on the HA address bus. Each burst preferably transfers four doublewords, each doubleword lasting approximately two clock cycles. It is understood that the present invention is not limited to a transfer of four doubleword byte transfers but can be as many as eight doubleword transfers or more in a burst sequence. Even a fast page mode DRAM, such as the 1M×4 TC514400J/Z-80 by Toshiba, which is one of the class of preferred DRAMs used in the specific embodiment disclosed, should have a row addressing period of 80 ns, which is four clock cycles if operating at the preferred clock frequency of 50 MHz, to allow for the parameters of the particular device and the various buffer and device delay times. Due to the significant length of set-up time required by the DRAMs and the speed of the burst write sequence on the HD host data bus, the DRAMs, without more, would simply be unable to store the first doubleword of data in a burst write sequence directly from the CPU 30 or the C5 cache controller 32 without numerous wait states.

A FIFO according to the present invention, implemented in each of the buffers 114 and 116 of the data buffer 44, solves the problem of the significant page mode entry time delay required by the DRAMs. The buffers 114 and 116 each latch or transfer every other data doubleword directly from the HD host data bus into or through a first level of buffers and then into a second level of buffers in order to provide the data doublewords to the DRAMs in a first-in first-out fashion. More significantly, the buffers 114 and 116 provide the data doublewords to the DRAMS of the memory 42 according to the timing requirements of the DRAMS while allowing the cache controller 32 to operate at its fastest practical speed with a 50 MHz clock. Technically, the C5 cache controller 32 used in the preferred embodiment is capable of providing data in 16 ns, which is within one 20 ns clock period of the 50 MHz clock, so that the C5 cache controller 32 theoretically supports data transfers in a single clock cycle. In practice, however, one wait state, or one clock cycle, is inserted for every data doubleword transfer to allow for inevitable system propagation delays and setting times. Therefore two 50 MHz clock cycles are the minimum practically possible period for burst data transfers. This practical minimum then forms the basic cycle, to which additional wait states are added only if necessary. Without the double buffer or FIFO of the present invention, the C5 cache controller 32 would have to insert additional wait states to give the DRAMs enough time to store the data on the HD data bus.

Figure 3:
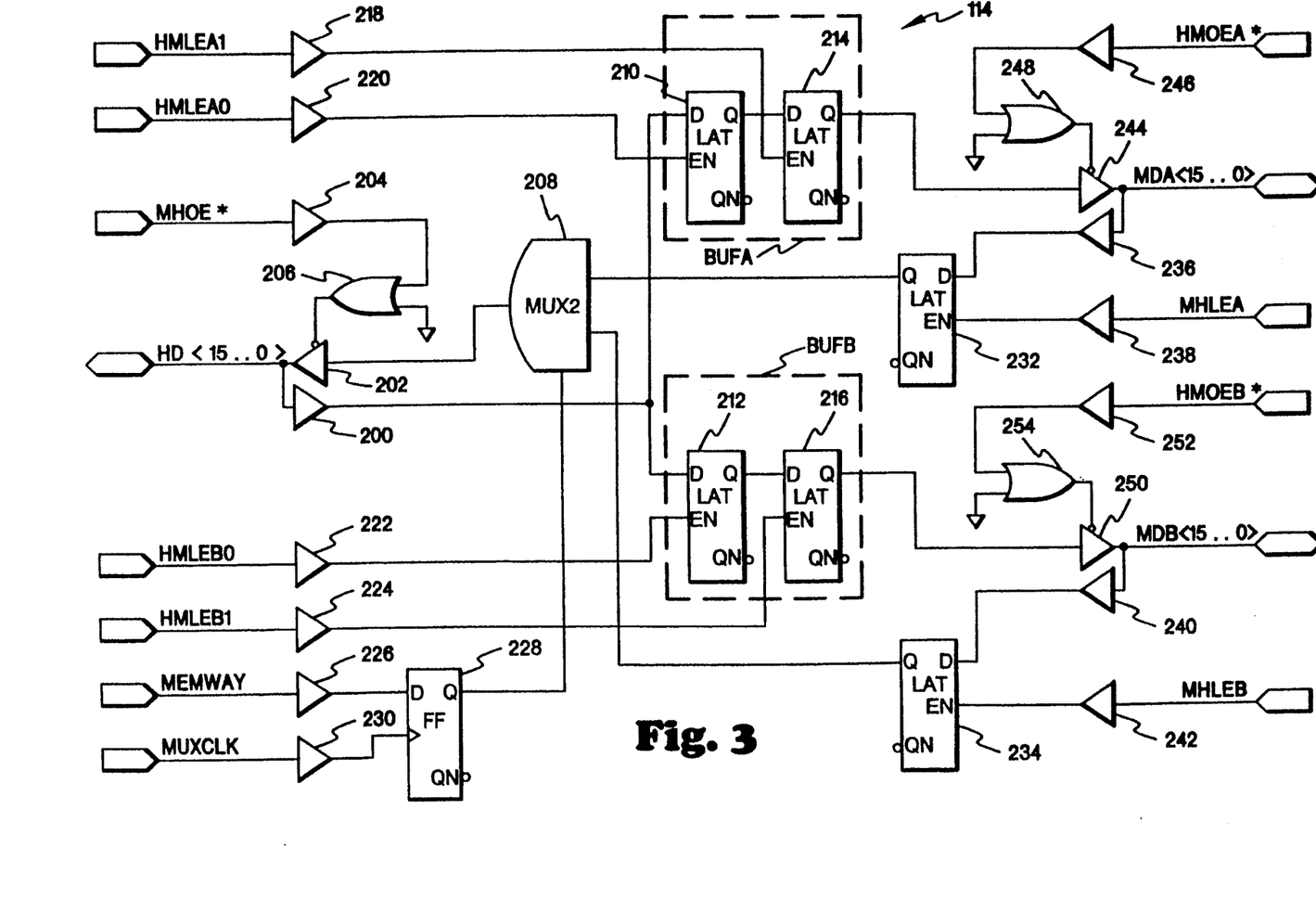
FIG. 3 is a schematic diagram showing a FIFO according to the present invention.

Referring now to FIG. 3, a schematic diagram of the double buffer or FIFO of the present invention is shown as embodied in the BUFFER1 114 of the buffer 44. The operation and implementation of the BUFFER2 116 is substantially similar to the BUFFER1 114, the only difference being that the BUFFER1 114 handles the lower HD<15..0> bits of the HD host data bus while the BUFFER2 116 handles the upper HD<31..16> data bits. The BUFFER1 114 includes parity logic and parity bits that are not shown in FIG. 3 for purposes of clarity. The lower HD<15..0> bits of the HD host data bus are connected to the inputs of a series of buffers 200. Although only one buffer is drawn, it is understood that the buffer 200 represents one buffer for each of the HD<15..0> data bits. The HD<15..0> data bits are also connected to the outputs of a series of tri-state buffers 202. Again, only one tri-state buffer is drawn representing one buffer for each of the HD<15..0> data bits.

A signal referred to as MHOE*, representing the memory-to-host output enable, is connected to the input of a buffer 204 and the output of the buffer 204 is connected to one input of a two-input OR gate 206. Throughout this disclosure, an asterisk at the end of a signal name indicates negative logic, wherein the signal is true when asserted low. Additionally, a signal name with a trailing asterisk is the inverse of the same signal name without the asterisk. The other input of the OR gate 206 is either grounded or connected to logic 0 during normal operation. The output of the OR gate 206 is connected to the inverted output enable inputs of the tri-state buffers 202. The data inputs of the tri-state buffers 202 are connected to the outputs of a multiplexor 208. In this manner, if the MHOE* signal is low, then the output of the OR gate 206 is low, thus enabling the outputs of the tri-state buffers 202 so that the multiplexor 208 drives the HD<15..0> bits of the HD host data bus. If the MHOE* signal is high, then the output of the OR gate 206 is high, disabling the outputs of the tri-state buffers 202.

The outputs of the buffers 200 are connected to the D inputs of a series of D latches 210 and also to the D inputs of a series of D latches 212. Data appearing on the HD<15..0> data bits are thus provided through the buffers 200 to the D latches 210 and 212. The Q outputs of the D latches 210 are connected to the D inputs of a series of D latches 214, and the Q outputs of the D latches 212 are connected to the D inputs of a series of D latches 216. The D latches 210 and 214 comprise a portion of the double buffer or FIFO according to the present invention, referred to as BUFA, which controls data flow from the HD<15..0> host data bits to the MDA<15..0> memory data bits. The D latches 212 and 216 comprise another portion of the double buffer or FIFO according to the present invention, referred to as BUFB, which controls data flow from the HD<15..0> host data bits to the MDB<15..0> memory data bits. The D latches 210 and 212 are the first level of latches and the D latches 214 and 216 are the second level of latches of the BUFA and BUFB buffers, respectively. In the preferred embodiment wherein the computer system C is operating at a clock speed of 50 MHz, it is noted that the latches 210 and 212 should be designed as fast latches to meet set-up and hold times which develop because of the various propagation delays in the particular technology utilized.

A signal HMLEA1, representing the host-to-memory latch enable for the second level of latches of the double buffer BUFA, is connected to the input of a buffer 218, and the output of the buffer 218 is connected to the control or gate inputs of the second series of D latches 214 of the BUFB buffer. The D latches 210–216 are transparent when the gate inputs are high and latched when the gate inputs are low. In other words, for each latch, when the gate input is high, the signal at the D input is provided at the Q output; when the gate input goes low, the data provided at the D input is latched to the Q output so that the data provided by the Q output does not change regardless of changes at the D input.

A signal HMLEA0, representing the host-to-memory latch enable for the first level of latches of the double buffer BUFA, is connected to the input of a buffer 220, and the output of the buffer 220 is connected to the gate inputs of the first series of D latches 210 of the BUFA buffer. A signal HMLEB1, representing the host-to-memory latch enable for the second level of latches of the double buffer BUFB, is connected to the input of a buffer 224 and the output of the buffer 224 is connected to the gate inputs of the second series of D latches 216 of the BUFB buffer. A signal HMLEB0, representing the host-to-memory latch enable for the first level of latches of the double buffer BUFB, is connected to the input of a buffer 222 and the output of the buffer 222 is connected to the inputs of the first series of D latches 212 of the BUFB buffer. As will be further described in detail below, the HMLEA0 and HMLEA1 signals control the double buffer BUFA during write cycles from the HD<15..0>bits of the HD host data bus to the MDA<15..0> bits of the MDA memory data bus, and the HMLEB0 and HMLEB1 signals control the double buffer BUFB during write cycles from the HD<15..0> bits of the HD host data bus to the MDB<15..0> bits of the MDB memory data bus.

A signal MEMWAY is connected to the input of a buffer 226 and the output of the buffer 226 is connected to the D input of a D flip-flop 228. A signal MUXCLK is connected to the input of a buffer 230 and the output of the buffer 230 is connected to the clock input of the D flip-flop 228. The Q output of the D flip-flop 228 is connected to the select input of the multiplexor 208. The Q outputs of a series of D latches 232 are connected to a first input of the multiplexor 208. The Q outputs of a series of D latches 234 are connected to a second input of the multiplexor 208. The MDA<15..0> bits are connected to the inputs of a series of buffers 236 and the outputs of the buffers 236 are connected to the D inputs of the D latches 232. A signal MHLEA, representing the memory-to-host latch enable for the MDA<15..0> data bits, is connected to the input of a buffer 238 and the output of the buffer 238 is connected to the gate inputs of the D latches 232. The MDB<15..0> data bits are connected to the inputs of a series of buffers 240 and the outputs of the buffers 240 are connected to the D inputs of the D latches 234. A signal MHLEB, representing the memory-to-host latch enable for the MDB<15..0> data bits, is connected to the input of a buffer 242 and the output of the buffer 242 is connected to the gate inputs of the D latches 234. As will be more fully described below, the MHLEA and MHLEB signals control the D latches 232 and 234 during data reads from the memory 42. The MUXCLK and MEMWAY signals control the multiplexor 208 to determine whether the data bits MDA<15..0> or MDB<15..0> from the memory 42 are placed at the output of the multiplexor 208. The MHOE* signal then enables the outputs of the tri-state buffers 202 when appropriate so that the output of the multiplexor 208 is provided to the HD<15..0> data bits.

The outputs of the D latches 214 are connected to the inputs of a series of tri-state buffers 244 and the outputs of the tri-state buffers 244 are connected to the MDA<15..0> bits. A signal HMOEA*, representing the host-to-memory output enable for the MDA data bus data bits MDA<15..0>, is connected to the input of a buffer 246 and the output of the buffer 246 is connected to one input of a two-input OR gate 248. The other input of the OR gate 248 is either connected to ground or to logic 0 during normal operation. The output of the OR gate 248 is connected to the inverted output enable inputs of the tri-state buffers 244.

The outputs of the D latches 216 are connected to the inputs of a series of tri-state buffers 250 and the outputs of the tri-state buffers 250 are connected to the MDB<15..0> data bits. A signal HMOEB*, representing the host-to-memory output enable for the MDB<15..0> data bits, is connected to the input of a buffer 252 and the output of the buffer 252 is connected to one input of a two-input OR gate 254. The other input of the OR gate 254 is either connected to ground or to logic 0 during normal operation. The output of the OR gate 254 is connected to the inverted output enable inputs of the tri-state buffers 250.

The general operation of the buffer 114 will now be described. During a write cycle to the main memory 42, data from the HD host data bus is provided to the main memory 42 through the buffer 44. Data entering the main memory 42 is partitioned, wherein data corresponding to even addresses is placed on the MDA memory data bus and provided to the way A 108 DRAMs, and data corresponding to odd addresses is placed on the MDB memory data bus and provided to the way B 110 DRAMs. The data provided to the buffer 44 from the HD data bus is split into the lower HD<15..0> bits which are coupled to the input of the BUFFER1 114, and the upper HD<31..16> bits which are coupled to the input of the BUFFER2 116.

The HD<15..0> data bits are input to the BUFFER1 114 through the buffers 200 and to the D latches 210 and 212. Even-addressed data is latched and/or passed through the D latches 210 and 214 of the double buffer BUFA as controlled by the HMLEA0 and HMLEA1 signals. If the HMOEA* signal is low, then the output of the OR gate 248 is low, thus enabling the outputs of the tri-state buffers 244 so that data from the Q outputs of the D latches 214 is provided to the MDA<15..0> bits of the MDA memory data bus. Odd-addressed data is likewise latched and/or passed through the D latches 212 and 216 of the double buffer BUFB as controlled by the HMLEB0 and HMLEB1 signals. If the HMOEB* signal is low, then the output of the OR gate 254 is low thus enabling the outputs of the tri-state buffers 250 so that data from the Q outputs of the D latches 216 is provided to the MDB<15..0> bits of the MDB memory data bus. In summary, data is provided from the HD data bus by the BUFA and BUFB buffers as controlled by the HMLEA0, HMLEA1, HMLEB0 and HMLEB1 signals, and driven on the MDA<15..0> and MDB<15..0> data bits by the tri-state buffers 244 and 250, respectively, as controlled by the HMOEA* and HMOEB* signals.

A read cycle from the main memory 42 to the HD data bus occurs in a similar manner as the write cycle described above, except that the double buffer structure according to the present invention is not utilized. During a read cycle, data is retrieved from memory 42 by the buffer 44 and is multiplexed onto the HD host data bus. Data from the way A 108 of the memory 42 is provided to the MDA memory data bus, and the MDA bus is split into the lower MDA<15..0> bits and the upper MDA<31..16> bits. As described previously, the BUFFER1 114 controls the lower data bits MDA<15..0>, while the BUFFER2 116 controls the upper data bits MDA<31..16>. Likewise, data from the way B 110 of the memory 42 is provided to the MDB memory data bus, and the MDB bus is split into the lower MDB<15..0> bits and the upper MDB<31..16> bits. The BUFFER1 114 controls the lower data bits MDB<15..0>, while the Referring again to FIG. 3, the data bits MDA<15..0> and MDB<15..0> are provided to the D latches 232 and 234 through the buffers 236 and 240, respectively. The Q outputs of the D latches 232 and 234 are provided to the first and second inputs, respectively, of the multiplexor 208. The Q output of the D flip-flop 228 controls the operation of the multiplexor 208. If the Q output of the D flip-flop 228 is low, then the data from the Q outputs of the D latches 232 is provided from the output of the multiplexor 208 to the inputs of the tri-state buffers 202. If the Q output of the D flip-flop 228 is high, then the data from the Q outputs of the D latches 234 is provided from the output of the multiplexor 208 to the inputs of the tri-state buffers 202. When valid data is being provided by the multiplexor 208 to the tri-state buffers 202, then the MHOE* signal is asserted low to provide the data to the HD<15..0> data bits of the HD host data bus. Therefore, data from either the MDA bus or the MDB bus through the multiplexor 208 is provided to the HD host data bus depending upon the Q output of the D flip-flop 228, and as long as the signal HMOE* is low.

The MEMWAY and MUXCLK signals control the operation of the D flip-flop 228, wherein the MUXCLK signal clocks the buffered MEMWAY signal from the buffer 230 to the Q output of the D flip-flop 228. If the data is read from the way A 108 to the MDA bus, then the MEMWAY signal is low so that the Q outputs of the D latches 232 are multiplexed through the multiplexor 208 and provided to the HD<15..0> data bits of the HD host data bus. Similarly, if the data is read from the way B 110 to the MDB bus, then the MEMWAY signal is high so that the Q outputs of the D latches 234 are multiplexed through the multiplexor 208 and provided to the HD<15..0> data bits of the HD host data bus.

A burst memory write sequence will now be described in detail since it illustrates the operation and significance of the present invention. The C5 state machine 100 contains the logic which provides the control signals to control the buffer 44. In the preferred embodiment, the C5 state machine 100 is advanced by a 50 MHz clock utilized to clock the microprocessor 30, the cache controller 32 and the cache data RAMs 34. The basic system is therefore developed around a 50 MHz version of the preferred 486 processor. This clock is generally referred to as a signal CLK2.

Operation of the state machine 100 commences in a reset state upon reset of the computer system C and then control proceeds to a read idle or RIDL state. All state transitions occur on the rising edge of the CLK2 signal. More details of the operation of the memory controller 40 are provided in the concurrently filed patent application Ser. No. 719,030 entitled Memory Controller For Use With Write-Back Cache and Bus Masters, which is hereby incorporated by reference. As is well known in the art, DRAMs require certain precharge times before a row address strobe can be provided. This is provided in the state machine 100 during the RIDL states when the memory subsystem is inactive, or in a WAIT state when a request is pending but the precharge times have not been satisfied. The C5 state machine 100 contemplates and operates with four basic types of cycles including single doubleword read and write cycles and burst read and write cycles. In the preferred embodiment, a burst cycle consists of eight doubleword or 32 bits which will be illustrated below to show the capability of the present invention. During a burst write sequence, if pre-charge is necessary, the state machine will remain in the WAIT state until precharge is complete. In many cases, including the one illustrated below, the memory system has been idle, in the RIDL state, sufficiently long that the precharge conditions are satisfied.

Once the pre-charge time has been completed, control proceeds to a RAS1 state. The state machine 100 subsequently steps from the RAS1 state to a RAS2 state, a RAS3 state and a RAS4 state on each on consecutive rising edges of the CLK2 signal. The RAS1-RAS4 states allow the DRAMs to enter into page mode as the row addresses are provided to the DRAMs. From the RAS4 state, the state machine 100 progresses to a CAS1 state, and then to a CAS2, a CAS3 and a CAS4 state on each consecutive rising edge of the CLK2 signal. The CAS1-CAS4 states provide the time necessary for the DRAMs to receive the column address and to write the data into the corresponding memory location. In a four doubleword burst sequence, the state machine 100 progresse from the CAS4 state to the CAS1 and CAS2 states, wherein the four doubleword cycle is completed. However, during an eight doubleword cycle, the CAS1-CAS4 states are repeated three times, followed by the CAS1 and CAS2 states to complete the eight doubleword transfer. A burst write sequence usually ends after the CAS2 state.

The C5 state machine 100 includes a programmable array logic (PAL) device whose outputs depend upon the states of the C5 state machine 100 as well as certain other logic signals of the computer system C. The present invention primarily concerns the four control signals HMLEA0, HMLEA1, HMLEB0 and HMLEB1 provided to the buffer 44. These signals control the operation of the BUFA and BUFB double buffers or FIFOs of the buffer 44. The PAL equations for the negative logic versions of the four signals HMLEA0, HMLEA1, HMLEB0 and HMLEB1 are given as follows:

| | |
|---|---|
| HMLEA0* := | RIDL · MADS + WIDL · MADS + WAIT · MADS + RAS1 · MADS + CAS2 · MADS · BLAST + RAS2 + RAS4 · LHA02* · LHW_R + CAS2 · LHA02 · LHW_R + CAS4 · LHA02* · LHW_R · BLAST* + EISA_LATCH |
| HMLEB0* := | RIDL · MADS + WIDL · MADS + WAIT · MADS + RAS1 · MADS + CAS2 · MADS · BLAST + RAS2 + RAS4 · LHA02 · LHW_R + CAS2 · LHA02* · LHW_R + CAS4 · LHA02 · LHW_R · BLAST* + EISA_LATCH |
| HMLEA1* := | RIDL · MADS · (HA02* · HW_R · WBAC* + LHA02* · WBAC) + WIDL · MADS · (HA02* · HW_R · WBAC* + LHA02* · WBAC) + WAIT · MADS · (HA02* · HW_R · WBAC* + LHA02* · WBAC) + RAS1 · MADS · (HA02* · HW_R · WBAC* + LHA02* · WBAC) + CAS2 · MADS · (HA02* · HW_R · WBAC* + LHA02* · WBAC) + RAS2 · (HA02 · HW_R · WBAC* + LHA02 · WBAC) + CAS2 · LHW_R + EISA_LATCH |
| HMLEB1* := | RIDL · MADS · (HA02 · HW_R · WBAC* + LHA02 · WBAC) + WIDL · MADS · (HA02 · HW_R · WBAC* + LHA02 · WBAC) + WAIT · MADS · (HA02 · HW_R · WBAC* + LHA02 · WBAC) + RAS1 · MADS · (HA02 · HW_R · WBAC* + LHA02 · WBAC) + CAS2 · MADS · (HA02 · HW_R · WBAC* + LHA02 · WBAC) + RAS2 · (HA02* · HW_R · WBAC* + LHA02* · WBAC) + CAS2 · LHW_R + EISA_LATCH |

The references to WIDL and WAIT are other states of the C5 state machine 100 which can be ignored for purposes of the present invention. The EISA_LATCH signal is true when an EISA cycle is occurring and also can be ignored. The MADS signal is the memory address strobe which is normally low but is asserted high when a valid address has been placed on the HA host address bus and valid control signals have been placed on the HCONTROL bus. It is asserted low again conventionally in the following RAS1 state but can be asserted in other states depending on various other conditions, such as pipelining. The HW_R signal is the host write/read signal which is high during write cycles and low during read cycles. The LHW_R signal is a latched version of the HW_R signal which generally remains valid until the next MADS signal assertion. The HA02 signal is the host address third least significant bit of the host address. The HA02 signal is used to indicate whether the data is intended for way A 108 or way B 110 of the memory 42. The LHA02 signal is a latched version of the HA02 signal. The WABC signal indicates a write-back cycle and can be ignored for purposes of the present invention. The BLAST* signal is asserted low during the last cycle of the burst sequence of a data transfer.

The PAL equations operate as follows. The ":=" symbol indicates that the signal is registered such that if any one of the terms is true in a given state, then the output is true in the following state. The "·" symbol is the logic "AND" operation and the "+" symbol is the logic "OR" operation. If any one of the terms on the right side of the ":=" symbol in the equation is true, then the output is true. The output signals HMLEA0*, HMLEA1*, HMLEB0* and HMLEB1* are true when asserted low. For example, referring to the PAL equation for the HMLEA0* signal, the HMLEA0* signal will be true, or low, in any state following a RIDL state wherein the MADS signal is true, or high, in the RIDL state. Note that the HMLEA0* signal is always true in any state following the RAS2 state, which is RAS3 for purposes of the present discussion. The HMLEA0*-HMLEB1* signals provided by the PAL are negated to provide the HMLEA0-HMLEB1 signals provided to the buffer 44.

Figure 4:
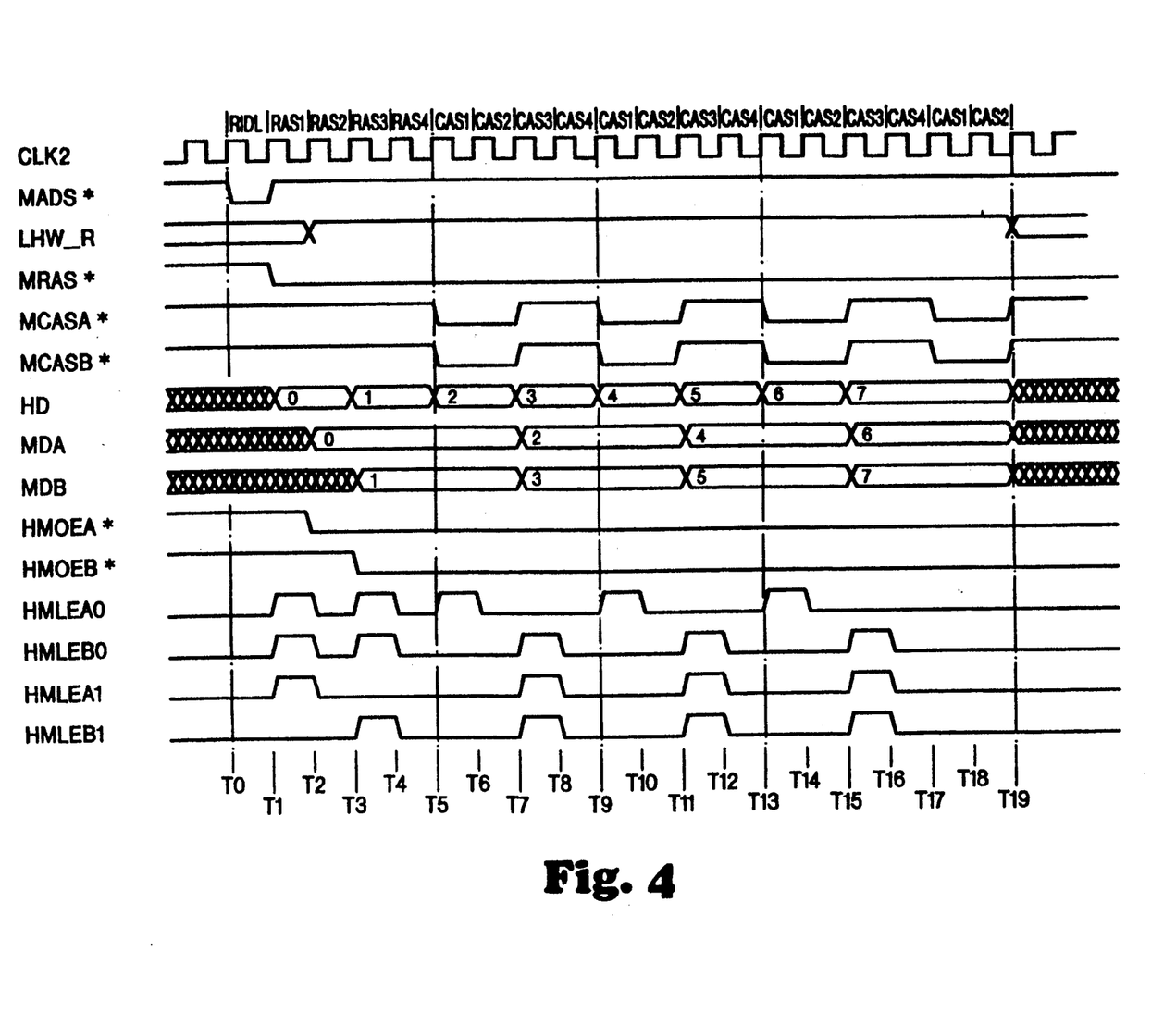
FIG. 4 is a timing diagram illustrating the operation of a FIFO according to the present invention during a burst write sequence.

Referring now to FIG. 4, a timing diagram illustrating the operation of a double buffer or FIFO according to the present invention during a burst write sequence is shown. At the top of the timing diagram, the states of the C5 state machine 100 are shown for each clock cycle. Below the states, the cycles of the CLK2 signal is shown operating at the preferred frequency of 50 MHz. An MRAS* signal is the memory row address strobe provided by the RAS logic 104. The MRAS* signal is asserted low to provide the row addresses of the DRAMs in the memory 42, so that the DRAMs can begin entry into page mode. A signal MCASA* is the memory column address strobe for the way A 108 DRAMs. Likewise, an MCASB* signal is the memory column address strobe for the way B 110 DRAMs. The MCASA* and MCASB* signals are asserted low to provide the column address strobes to the way A 108 and way B 110 DRAMs of the memory 42, respectively. An MADS* signal is the same signal as the MADS signal except the MADS* signal is true when asserted low.

At a time T0, the MADS* signal is asserted low indicating that a valid address is present on the HA host address bus and valid control signals are on the HCONTROL bus while the C5 state machine 100 is in the RIDL state. In the RIDL state, the LHW_R signal is undetermined, the MRAS*, MCASA* and MCASB* signals are high, and there is no valid data on the HD host data or the MDA or MDB memory data buses. The HMLEA0, HMLEB0, HMLEA1 and HMLEB1 signals are all negated low. At a time T1, the MADS* signal is negated high and the state machine 100 enters the RAS1 state. At the time T1, the DRAMs in the memory 42 have been pre-charged and are ready for a valid row address to begin initializing into page mode. In the illustrated example it is assumed that sufficient pre-charge has been developed while in the RIDL state. If not, the WAIT state would be entered until pre-charge was complete, three CLK2 signal cycles at a maximum, and then the state machine would proceed to the RAS1 state. The signal MRAS* signal is asserted low at the time T1 and valid data is asserted onto the HD host data bus. The HMLEA0 signal is asserted high at the time T1 since, according to the PAL equation for the HMLEA0* signal provided above, during the previous RIDL state the MADS signal was high. Therefore, the HMLEA0* signal is true (low) causing the HMLEA0 signal to be true (high). Likewise, according to the PAL equation for the HMLEB0 signal, the HMLEB0* signal is asserted high at the time T1.

If the address on the HA address bus is an even address, the HA02 signal is low and remains low throughout the entire burst write sequence. Although the following discussion will assume the address is even, the case wherein the address is odd requires only a slight modification which will also be described. The HA02 signal being low indicates that the data appearing on the HD host data bus corresponds to an even address, and that the data is to be written to the way A 108. Also, the unlatched version of the HW_R signal is asserted high, indicating that the current cycle is a write cycle. Therefore, according to the RIDL term of the PAL equations for the HMLEA1* and HMLEB1* signals, the HMLEA1 signal is asserted high at the time T1, whereas the HMLEB1 signal remains low. FIG. 3 shows that if the HMLEA0 and HMLEA1 signals are asserted high, the data appearing on the HD host data bus is provided at the output of the D latches 214 of the buffer BUFA. Therefore, the data appearing at the HD host data bus now appears at the tri-state buffers 244. Since the HMLEB1 signal remains negated low at the time T1 during the $RAS_1$ state, the Q outputs of the D latches 216 remain unlatched so that the MDB memory address bus remains undetermined.

At a time T2, the state machine 100 enters the RAS2 state and the LHW_R signal is asserted high. The HMOEA* signal is asserted and the values being output by the latch 214 are now provided to the MDA data bus. The HMOEA* signal remains asserted low for the remainder of the cycle, so data output by the latch 214 is passed directly onto the MDA data bus. The HMLEA0 signal is negated low since the MADS signal was low during the previous $RAS_1$ state according to the HMLEA0* PAL equation. Likewise, according to the $RAS_1$ terms of the PAL equations, the HMLEB0, HMLEA1 and HMLEB1 signals are negated low at the time T2. These signals remain negated low during the RAS2 state. At a time T3, a new data doubleword is placed on the HD host data bus corresponding to an odd address, and is therefore intended for the way B 110. The state machine 100 enters the RAS3 state at the time T3. The HMOEB* signal is asserted low and any data output by the latch 216 is provided to the MDB data bus. The HMOEB* signal remains asserted low for the remainder of the cycle. The HMLEA0 and HMLEB0 signals are asserted high in the RAS3 state according to the RAS2 term of the HMLEA0* and HMLEB0* PAL equations. The HMLEA1 signal, however, remains negated low in the RAS3 state since the HA02 signal is low in the RAS2 state, whereas the HMLEB1 signal is asserted high at the time T3 since the HA02* signal is high and the HW_R signal is high in the $RAS_2$ state. Note that since the HMLEA1 signal remains low during the RAS2 and RAS3 states, the MDA memory data bus remains stable and asserted with the data doubleword provided to it at the time T1. However, the assertion of HMLEB0 and HMLEB1 signals high provides the new data doubleword from the HD host data bus to the MDB memory data bus at the time T3. The data appearing at the HD host data bus is transferred to the MDB bus since the D latches 212 and 216 are transparent during the RAS3 state.

At a time T4, the state machine 100 enters the RAS4 state. All of the HMLEA0, HMLEA1, HMLEB0 and HMLEB1 host-to-memory latch enable signals are negated low during the RAS4 state since there are no RAS3 terms in the PAL equations. Therefore, the MDA and MDB memory data buses remain stable during the RAS4 state. Also, the data doubleword provided on the HD data bus at the time T3 is latched into the D latches 212 and 216.

At a time T5, the state machine 100 enters the CAS1 state wherein the master column address strobes MCASA* and MCASB* are asserted low, indicating a column address is now available to the DRAMs of the memory 42 and indicating that the data is to be latched into the memory devices according to the preferred embodiment. The MCASA* and MCASB* remain asserted low for two CLK2 clock cycles before being negated high again based on the timing requirements of the DRAMs. The DRAMs are fully established in page mode at the time T5 and can receive consecutive subsequent column addresses during the CAS states. Also, a new data doubleword is placed on the HD host data bus to be transferred to the way A 108 The LHLA02 signal is low and the LHA02* signal is high because the initial address was to an even location. Therefore, according to the RAS4 term of the PAL equation for the HMLEA0* signal the HMLEA0 signal 08. The LHA02 signal is low and the LHA02* signal is high because the initial address was to an even location. Therefore, according to the RAS4 term of the PAL equation for the HMLEA0* signal, the HMLEA0 signal is asserted high at the time T5 in the CAS1 state. However, the HMLEB0 signal remains negated low in the CAS1 state according to the RAS4 term of the HMLEB0* signal. The HMLEA1* and HMLEB1* signals do not include a RAS4 term and thus the HMLEA1 and HMLEB1 signals remain negated low in the CAS1 state. Therefore, the MDA and MDB memory data buses remain unchanged since the MHLEA1 and HMLEB1 signals remain negated low in the CAS1 state. However, the data appearing on the HD host data bus during the CAS1 state is provided to the Q outputs of the D latches 210 since the HMLEA0 signal is asserted high.

At a time T6, the state machine enters the CAS2 state and the HMLEA0 signal is negated low since there is no CAS1 term in the HMLEA0* PAL equation. At this time, the data appearing at the HD host data bus is now latched into the D latches 210 of the BUFA. The HMLEB0, HMLEA1 and HMLEB1 signals remain negated low during the CAS2 cycle since there are no CAS1 terms in the corresponding PAL equations. Since the HMLEA1 signal remains negated low, the data doubleword latched into the D latches 210 does not appear on the MDA memory data bus since the D latches 214 are not opened. The D latches 214 and the BUFA are still providing the first data doubleword appearing on the HD host data bus since the way A 108 DRAMs are being provided with a column address and are writing the first data doubleword into memory. Notice that the third data doubleword is retrieved from the HD host data bus and stored in the D latches 210. Once the way A 108 DRAMs have stored the first data doubleword, the D latches 214 can latch the third data doubleword from the D latches 210 and provide the data to the way A 108 DRAMs.

At a time T7, the MCASA* and MCASB* signals are negated high, ending the storage of the data and that particular cycle. The state machine 100 enters the CAS3 state, and a new data doubleword appears on the HD host data bus corresponding to an odd address intended for the way B 110. Since the MADS* signal remained negated high in the CAS2 state, the MADS signal was low in the CAS2 state and the HMLEA0 signal remains negated low in the CAS3 state according to the HMLEA0* PAL equation. However, the HMLEB0 signal is asserted high at the time T7 and during the CAS3 state due to the second CAS2 term in the PAL equation for the HMLEB0* signal, wherein the LHA02* signal is high and the LHW_R signal is high. Likewise, the HMLEA1 and HMLEB1 signals are asserted high in the CAS3 state due to the CAS2 term in the PAL equations for the HMLEA1* and HMLEB1* signals, respectively. Recall that the HMLEA0 signal latched the data doubleword appearing on the HD host data bus during the CAS1 and CAS2 states into the D latches 210. This data doubleword is now provided at the Q outputs of the D latches 214 of the BUFA buffer since the HMLEA1 signal is asserted high in the CAS3 state, and is, therefore, provided to the MDA memory data bus. Also note that the HMLEA0 signal remains low in the CAS3 state such that the fourth data doubleword provided on the HD host data bus does not appear at the outputs of the D latches 210. Since the HMLEB0 and HMLEB1 signals are asserted high in the CAS3 state, and a new data doubleword appears on the HD host data bus, this new data doubleword is passed through the BUFB and is provided to the MDB memory data bus.

At a time T8, the state machine 100 enters the CAS4 state and the HMLEA0, HMLEB0, HMLEA1 and HMLEB1 signals are negated low in the CAS4 state since there are no CAS3 terms in the PAL equations. Since the HMLEA1 signal is negated low, the third data doubleword provided on the HD host data bus is now latched into the D latches 214 of the BUFA. Also, the HMLEB0 and HMLEB1 signals negated low latch the fourth data doubleword into both the D latches 212 and 216 of the BUFB. Since all of the host-to-memory latch enable signals remain low in the CAS4 state, the MDA and MDB memory data buses remain stable and unchanged.

At a time T9, the state machine 100 re-enters the CAS1 state from the CAS4 state, indicating a new column address is provided on the MA memory address bus to the DRAMs of the memory 42. Therefore, at the time T9, the MCASA* and MCASB* signals are asserted low. The HMLEA0 signal is again asserted high in the CAS1 state, but this time due to the CAS4 term in the HMLEA0* PAL equation. In the previous CAS4 state, the LHW_R signal was high and the BLAST* signal was high since the BLAST* signal is only asserted low during the last data cycle of the burst sequence. The state machine 100 cycles through the CAS1 to CAS4 states in a similar manner as described above until the write burst cycle is completed. The write burst cycle always ends after a CAS2 state. Again, during the CAS1 state a new data doubleword appears on the HD host data bus corresponding to an even address and intended for the way A 108. The HMLEA0, HMLEB0, HMLEA1 and HMLEB1 signals repeat the same sequence in the next CAS1 to CAS4 cycle as in the previous CAS1 to CAS4 cycle as indicated by the HMLEA0*-HMLEB1* PAL equations. Therefore, the HMLEA0 signal is asserted high during the CAS1 state and is negated low during the remaining CAS2-CAS4 states. The HMLEB0 signal is asserted high in the CAS3 state but is negated low in the CAS1, CAS2 and CAS4 states. The HMLEA1 and HMLEB1 signals are asserted high in the CAS3 state and are negated low in the CAS1, CAS2 and CAS4 states. These signals also repeat the same sequence in the next CAS1-CAS4 cycle. Therefore, the new data doubleword appearing on the HD host data bus during the CAS1 state is latched into the D latches 210 since the signal HMLEA0 is asserted high in the CAS1 state and negated low in the CAS2 state. The HMLEA0, HMLEB0, HMLEA1 and HMLEB1 signals all are negated low in the CAS2 state. Again, the HMLEB0, HMLEA1 and HMLEB1 signals are all asserted high during the CAS3 state while the HMLEA0 signal is negated low in the CAS3 state. Therefore, since the HMLEA1 signal is asserted high in the CAS3 state, the data latched into the D latches 210 during the previous CAS1 state is transferred to the Q outputs of the D latches 214 of the BUFA so that this latched data appears at the output of the MDA memory data bus in the CAS3 state. Also, since the HMLEB0 and HMLEB1 signals are asserted high in the CAS3 state, the new data doubleword appearing on the HD host data bus during the CAS3 state is transferred through the D latches 212 and 214 to the MDB memory data bus. The HMLEB0-HMLEB1 signals are negated low in the CAS4 state, such that the MDA and MDB memory data buses remain unchanged.

At a time T13 the state machine 100 re-enters the CAS1 state and the entire cycle between the CAS1-CAS4 states repeats until a time T17. The HMLEA0, HMLEB0, HMLEA1 and HMLEB1 signals again repeat the same sequence as in the previous CAS1-CAS4 state cycle. Therefore, the data doubleword appearing on the HD host data bus during the CAS1 state is latched into the D latches 210 during the CAS1 state, and is transferred to the output of the MDA memory data bus during the subsequent CAS3 state when the HMLEA1 signal is asserted high. Again, in the CAS3 state, the HMLEB0 and HMLEB1 signals are asserted high so that the new data doubleword appearing during the CAS3 state on the HD host data bus is transferred onto the MDB memory data bus.

In the CAS4 state, during the time period between a time T16 and the time T17, the BLAST* signal is asserted low, indicating that the last data doubleword is provided on the HD host data bus. The HMLEA0 signal is, therefore, not asserted high in the following CAS1 state due to the CAS4 term in the HMLEA0* PAL equation. Since none of the host-to-memory latch enable signals are asserted in the CAS1 and CAS2 states between the time T17 and a time T19, the MDA and MDB memory data buses remain unchanged. The entire burst write sequence ends at the time T19.

It is noted that the MCASA* and MCASB* signals are asserted low during the CAS1 and CAS2 states to load the data into the DRAMs. It is also noted that an external sequencer (not shown) for the address values is preferred to allow proper addressing of the DRAMs during the cycle.

A review of the CAS1-CAS4 state cycles shows that at the beginning of the cycle, in the CAS1 state, a new data doubleword appears on the HD host data bus. This data doubleword stays on the HD data bus until the CAS3 state, when a new data doubleword appears on the HD data bus during the CAS3 to CAS4 states. The data doubleword appearing on the HD data bus during the CAS1 to CAS2 states is latched into the D latches 210 of the BUFA and is subsequently latched into the D latches 214 during the CAS3 state. The data is therefore provided to the MDA memory data bus beginning in the CAS3 state. The new data doubleword appearing on the HD host data bus during the CAS3 state is latched into the D latches 212 and 214 of the BUFB, and thus transferred to the MDB memory data bus during the CAS3 state, and held stable until the following CAS3 state. The even addressed data, therefore, is provided to the MDA bus delayed by two clock cycles and is held for four clock cycles until the subsequent CAS3 state. The odd addressed data is transferred through the BUFB buffer when it appears on the HD host data bus and is held for four clock cycles until the following CAS3 state.

The CAS1 to CAS4 states could be designed to repeat indefinitely since the BUFA and BUFB buffers according to the present invention, along with the interleaved operation and page mode speed of the DRAMs, allow the DRAMs to maintain the cycle speed of the state machine 100. In other words, the data appearing on the HD host data bus is captured and provided to the DRAMs of the corresponding A and B ways of the memory 42, due to the action of the BUFA and BUFB double buffers according to the present invention, without incurring additional wait states. Note that an eight doubleword burst write sequence has occurred on the HD host data bus and that all of the data appearing on the HD host data bus has been transferred to the MDA and MDB memory data buses. The data corresponding to the even addresses is transferred to the MDA memory data bus and the data corresponding to the odd addresses is transferred to the MDB memory data bus.

Referring back to the time T1 and the RAS1 state, the first data doubleword appearing on the HD host data bus is captured by the BUFA to be provided to and held on the MDA memory data bus until the end of the subsequent CAS2 state. This time period provides sufficient time for the DRAMs of the preferred embodiment of way A 108 to establish page mode addressing and to capture the data from the MDA memory data bus. Also, when a new data doubleword is provided on the HD host data bus at the beginning of the RAS3 state, the BUFB captures this data at the time T3 and holds the data until the end of the following CAS2 state. In this manner, the DRAMs in the way B 110 are given sufficient time to establish page mode and can store the data from the BUFB that appeared on the HD host data bus during the RAS3 and RAS4 states. Once the DRAMs of the memory 42 are initialized into page mode, the double buffers or FIFOs according to the present invention work in conjunction with the interleaved memory 42 to allow the DRAMs to keep pace with the C5 cache controller 32 without additional wait states.

Recall the entire discussion above of the burst write sequence assumed that the first address appearing on the HA host address bus is even such that the HA02 and LHA02 signals are low. If the first address is odd, the HA02 and LHA02 signals would be high and the first, third, fifth, and seventh data doublewords appearing on the HD host data bus are intended for the MDB memory data bus, whereas the second, fourth, sixth and eighth data doublewords are intended for the MDB memory data bus. Referring to the PAL equations, the only difference between the HMLEA0* and HMLEB0* equations is that the HA02 and LHA02 signals are opposite. Likewise, the only difference between the HMLEA1* and HMLEB1* equations is that the HA02 and LHA02 signals are opposite. Therefore, referring to FIG. 4, if the first address is odd such that the HA02 and LHA02 signals are high, the trace for the HMLEA0 signal should be swapped with the trace for the HMLEB0 signal and the trace for the HMLEA1 signal should be swapped with the trace for the HMLEB1 signal. Also, this causes the traces for the MDA and MDB signals to be swapped so that the first, third, fifth and seventh data doublewords appearing on the HD host data bus are transferred to the MDB memory data bus and the second, fourth, sixth and eighth data doublewords are transferred to the MDA memory data bus. In this manner, the data corresponding to even addresses is still stored in the DRAMs of the way A 108 while the data corresponding to odd addresses is stored in the DRAMs of the way B 110.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

We claim:

1. A computer system, comprising:

a system bus having address bus and data bus portions;

means coupled to said system bus for providing an address on said system address bus and for consecutively providing a plurality of data packets onto said system data bus;

a plurality of memory devices, each memory device including address and data inputs, said memory devices organized into at least two separate ways with a resulting data bus for each way, wherein said memory devices are page mode dynamic random access memory devices;

a first buffer coupled to said system data bus and to a first memory way data bus; and a second buffer coupled to said system data bus and to a second memory way data bus, wherein said first buffer includes a first latch having inputs coupled to said system data bus and having outputs and a second latch having inputs connected to said first latch outputs and having outputs coupled to said first memory way data bus, and wherein said second buffer includes a first latch having inputs coupled to said system data bus and having outputs and a second latch having inputs connected to said first latch outputs and outputs coupled to said second memory way data bus.

2. The computer system of claim 1, wherein said first includes a third latch having inputs and outputs, wherein said inputs are coupled to said first memory way data bus and said second buffer includes a third latch having inputs and outputs, wherein said inputs are coupled to said second memory way data bus;

the computer system further comprising a multiplexor having inputs connected to both of said buffer third latch outputs and having outputs coupled to said system data bus and having a select input for selecting between said first and second buffer third latch output.

3. The computer system of claim 2, wherein said multiplexor includes a tri-state buffer having inputs connected to said multiplexor outputs and having outputs connected to said system data base.

4. The computer system of claim 1, wherein said first buffer includes a tri-state buffer having inputs connected to said second latch outputs and outputs connected to said first memory way data bus and wherein said second buffer includes a tri-state buffer having inputs connected to said second latch outputs and outputs connected to said second memory way data bus.

5. The computer system of claim 1, wherein said data packet providing means includes a processor system capable of performing burst operations.

6. The computer system of claim 5, wherein said processor system includes a microprocessor and a cache memory system.

7. The computer system of claim 1, wherein said first and second latches of each said buffer include gate inputs to control data transmission and storage, and the computer system further comprising:

means coupled to said system bus and said gate inputs of said first and second latches of said first and second buffers for providing signals to said gate inputs for sequencing data through and storage in said latches.

8. The computer system of claim 7, wherein said gate input signal providing means sequences said gate input signals so that said first buffer second latch stores a first data packet, and second buffer second latch stores a second data packet, said first buffer first latch stores a third data packet with said first buffer second latch thereafter replacing said first data packet and storing said third data packet and said second buffer second latch replacing said second data packet and storing a fourth data packet.

9. The computer system of claim 8, wherein said gate input signal providing means further sequences said gate input signals after said fourth data packet is stored by said second buffer second latch so that said first buffer first latch stores odd data packets with said first buffer second latch thereafter replacing a stored data packet with an odd data packet stored by said first buffer first latch and said second buffer second latch replacing stored data packets with even data packets.

10. The computer system of claim 8, further comprising:

means for providing a clock signal, said clock signal coupled to said data packet providing means and said gate input signal providing means, and wherein said data packet providing means provides a data packet on a given number of cycles of said clock signal.

11. The computer system of claim 10, wherein said memory devices have a page hit cycle time less than said given number of clock signal cycles and a page miss cycle time greater than said given number of clock signal cycles.

12. The computer system of claim 11, wherein said data packet providing means provides said data packets without inclusion of additional wait states.

13. A computer system, comprising:

a system bus having an address bus portion and a data bus portion;

means coupled to said system data bus for consecutively providing a plurality of data packets onto said system data bus;

a plurality of memory devices, each memory device including data inputs, said memory devices organized into at least two separate ways with resulting data buses for each way, wherein said memory devices are page mode dynamic random access memory devices;

means coupled to said system bus and each said memory way data buses for receiving and storing data packets and providing said data packets to said memory devices, a first memory way receiving odd data packets and a second memory way receiving even data packets, said receiving and storing means storing said data as provided from said data packet providing means and providing an odd data packet to said first memory way and an even data packet to said second memory way while latching an additional data packet being provided from said data packet providing means.

14. The computer system of claim 13, further comprising:
    means for providing a clock signal, said clock signal coupled to said data packet providing means and said data packet receiving and storing means, and wherein said data packet providing means provides a data packet on a given number of cycles of said clock signal.

15. The computer system of claim 14, wherein said memory devices have a page hit cycle time less than said given number of said clock signal cycles and a page miss cycle time greater than said given number of clock signal cycles.

16. The computer system of claim 15, wherein said data packet providing means provides said data packets without inclusion of additional wait states.

* * * * *

UNITED STATES PATENT AND TRADEMARK OFFICE
CERTIFICATE OF CORRECTION

PATENT NO. : 5,289,584
DATED : February 22, 1994
INVENTOR(S) : Gary W. Thome et al.

It is certified that error appears in the above-identified patent and that said Letters Patent is hereby corrected as shown below:

Column 12,
Line 34, after "while the" insert -- BUFFER2 116 controls the upper data bits MDB<31..16>. --.

Signed and Sealed this

Third Day of January, 2006

JON W. DUDAS
*Director of the United States Patent and Trademark Office*